Patented Mar. 31, 1942

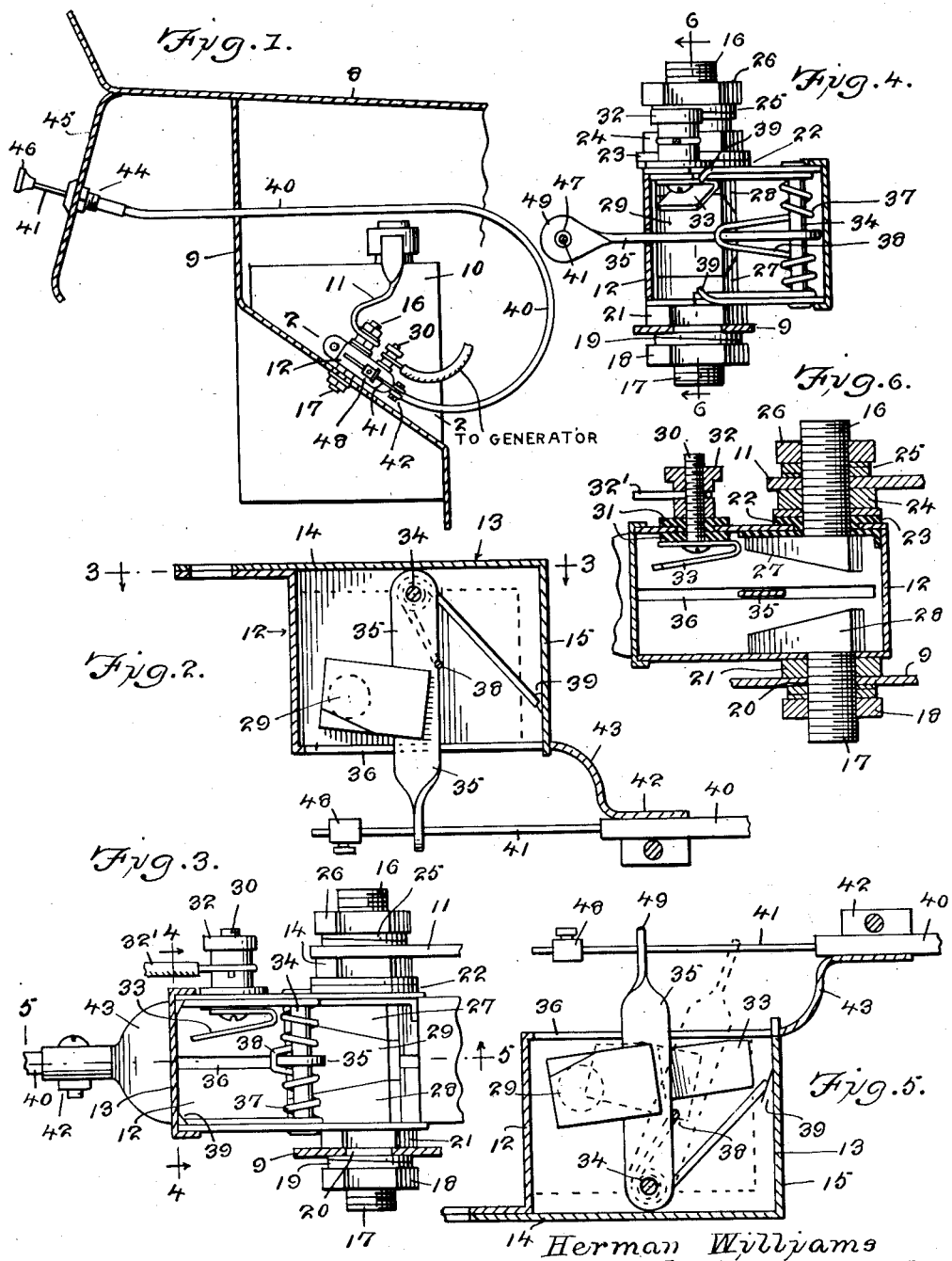

2,277,671

UNITED STATES PATENT OFFICE 2,277,671

ELECTRICAL SWITCH

Herman Williams and Lee A. Williams,
Huntington, W. Va.

Application June 24, 1940, Serial No. 342,184

1 Claim. (Cl. 200—6)

The present invention relates to improvements in electrical switches and is primarily designed to permit the disconnecting of an automobile battery from a point remote from the battery.

The primary object of the invention resides in the provision of an electric switch to which the ground cable of an automobile battery is connected and including means to be operated from the driver's seat of the automobile to disconnect the battery to thereby break the circuit to the ignition for preventing operation of the automobile.

A further object of the invention is the provision of a switch of this character wherein the same can be conveniently mounted regardless of the location of the battery with respect to the driver's seat, a portion of the switch casing acting as a ground for the battery but under control from the driver's seat for making and breaking the circuit to the ignition.

The advantages of the switch as constructed in accordance with the present invention are many, some of which are the preventing of current leakage with a consequent drain upon the battery, especially when the vehicle is idle, to prevent the hazard of a fire in case of a short circuit in the electric system, as a protection against the unauthorized use of the vehicle, and numerous other advantages which will be readily apparent from an inspection of the drawing and a consideration of the following specification.

The invention will be fully and comprehensively understood from a consideration of the following detailed description when read in connection with the accompanying drawing which forms a part of the application.

In the drawing:

Figure 1 is a vertical sectional view of a portion of a vehicle illustrating the switch in use.

Figure 2 is a detail sectional view taken substantially on line 2—2 of Figure 1.

Figure 3 is a longitudinal sectional view taken substantially on line 3—3 of Figure 2.

Figure 4 is a vertical sectional view taken substantially on line 4—4 of Figure 3.

Figure 5 is a longitudinal sectional view taken substantially on line 5—5 of Figure 3.

Figure 6 is a vertical sectional view taken substantially on line 6—6 of Figure 4.

Referring to the drawing for a more detailed description thereof, a portion of an automobile body is generally designated by the reference numeral 8, in the present instance, indicating the hood of the automobile, a portion of the frame being indicated at 9. The battery 10 is conventionally mounted beneath the hood, the ground plug and cable being indicated at 11. The ground cable is generally fastened to the frame of the vehicle but as will be hereinafter apparent, the present invention provides for attachment of said cable to the switch.

The improved switch includes a substantially rectangular-shaped housing generally designated by the reference numeral 12 closed by means of a cover 13, said cover forming a top and end wall 14 and 15, respectively, for the housing. As will be hereinafter apparent, the housing is to be mounted on the frame of the automobile in close proximity to the battery, the relation of which is readily apparent from an inspection of Figure 1 of the drawing.

Threaded posts 16 and 17, respectively, extend from each side wall of the housing, the post 16 adapted to receive the battery ground cable 11 and the post 17 extends through the frame of the vehicle for grounding the switch housing. The post 17 further serves as a means of attaching the housing 12 to the frame of the automobile as more clearly shown in Figure 1 of the drawing. When attaching the housing the lock nut 18 and washer 19 are removed and said post is inserted through an opening 20 appropriately formed in the frame 9. The washer 19 is then replaced and the nut 18 locked against said washer, the nut 21 maintaining the housing spaced from the frame 9 as more clearly shown in Figure 6 of the drawing.

The post 16 is insulated from the housing 12 by means of a washer 22 and mounted adjacent said insulating washer are a lock washer 23 and lock nut 24. The ground cable 11 from the battery is disposed over the post 16 adjacent the lock nut 24 and is held thereon by means of the washer 25 and lock nut 26. Thus it will be seen that the battery 10 has a ground connection to the frame of the vehicle through the respective posts 16 and 17.

Wedge-shaped contact blocks 27 and 28 are carried by the posts 16 and 17, respectively, being disposed within the housing 12 and are stationarily mounted within said housing. A central wedge-shaped contact block 29 is movably held between the blocks 27 and 28 and when in the position shown in Figure 3 of the drawing the battery is grounded to the frame of the vehicle through the housing. However, the block 29 is movable when desiring to disconnect the battery thereby breaking the ground connection to the frame, the means for actuating the block 29 to be hereinafter more fully described.

One feature of the present invention also provides for the provision of a connection for attaching the generator wire from the switch box to the generator cut out to ground the generator simultaneously with disconnecting the battery. A screw threaded post 30 projects from the side wall of the housing to which the threaded post 16 is attached, the former being suitably insulated by means of the washers 31. A nut 32 is threadedly mounted on the post 30 for clamping the connection 32 from the generator to the post. The post 30 supports a substantially U-shaped spring 33 within the housing, said spring adapted to be compressed when moving the contact block 29 out of engagement with the contact blocks 27 and 28 to ground the generator.

The contact block 29 is suspended on a pin 34 which extends through the side walls of the housing adjacent the upper end thereof. An arm 35 is mounted on the pin 34 and extends through a slot formed in the central contact block 29, the lower end of said arm projecting through a transverse slot 36 formed in the bottom wall of the housing. Movement of the arm 35 effects engagement and disengagement of the central block 29 with the blocks 27 and 28. A spring 37 has its intermediate portion surrounding the pin 34 and a portion 38 thereof in contact with the depending arm 35 to effect sufficient tension when actuating the central contact 29. The ends of the spring 37 are in engagement with portions 39 projecting from the side walls of the housing.

The arm 35 is to be actuated from the driver's seat of the automobile when desiring to disconnect the battery, and for accomplishing this purpose there is provided a flexible housing 40 through which extends a wire cable 41, one end of the flexible housing being suitably clamped as indicated at 42 to an extension 43 of the housing 12, the other end of the flexible housing being mounted as indicated at 44 to the instrument panel 45 of the vehicle. The wire cable, which extends through the flexible housing 40, is provided at one end with a knob 46 and the other end thereof passes through an opening 47 formed in the free end of the arm 35 and has attached thereto a block 48. Pulling outwardly on the wire 41 by means of the knob 46 will move said wire through the flexible housing to bring the block 48 into contact with the end 49 of the arm 35 and a continued pull will effect movement of the arm against the tension of the spring 37 from the full line to the dotted line position shown in Figure 5 of the drawing. As the arm moves on its pivot pin 34 the central switch block 29 will be disengaged from the contact blocks 27 and 28 thereby disconnecting the battery. Continued movement of the wedge-shaped block outwardly will bring it in contact with the spring 33 to compress the same against the head of the threaded post 30 to ground the generator simultaneously with the disconnecting of the battery. If the generator were not disconnected, the motor would continue to operate from the generator current. Thus grounding the generator precludes this possibility. When desiring to again connect the battery, the wire cable 41 is pushed inwardly through its flexible housing 40 to move the arm 35 and central contact block 29. The tension spring 37 aids in returning the central contact block into operative contact with the blocks 27 and 28. Of course, as soon as the central contact block 29 is moved toward the blocks 27 and 28, pressure on the spring 33 will be released to permit normal functioning of the generator.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

In a switch of the character described, a casing of current conductive material, a pair of complementary contact members mounted within the casing, a binding post connected with one of the said contact members and extending through the casing for connecting the said contact member and the casing with a ground contact, a second binding post connected with the complementary contact member and extending through the casing for connection with a wire from a battery, the said last mentioned binding post being insulated from the said casing, a generator terminal post extended through the casing and having its outer end connected with a generator wire, the said generator terminal post being insulated from the casing, a contact member secured to the generator terminal post and disposed in the casing, an arm of conductive material pivotally and electrically connected with the casing, and a movable contact member secured to the said arm operable to engage the complementary contact members to ground the battery connection and movable to an off position disconnected from the complementary contact members to engage the generator contact member to ground the generator terminal through the casing.

HERMAN WILLIAMS.
LEE A. WILLIAMS.